Oct. 1, 1929.　　J. P. LANNEN　　1,729,947
WHEEL BALANCING APPARATUS
Filed April 1, 1926
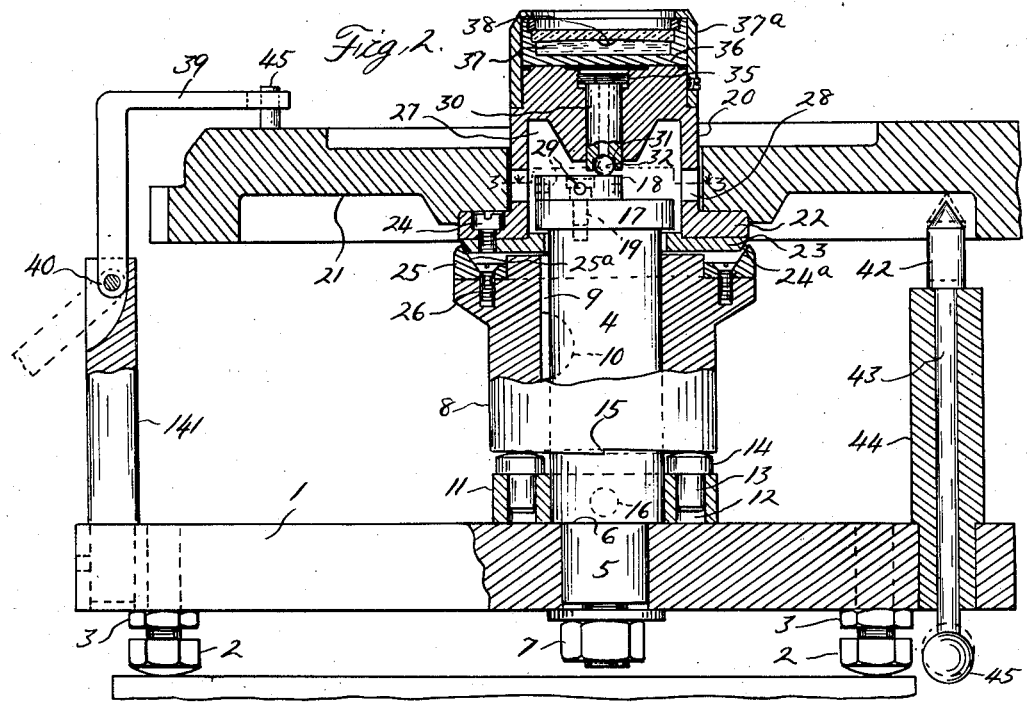
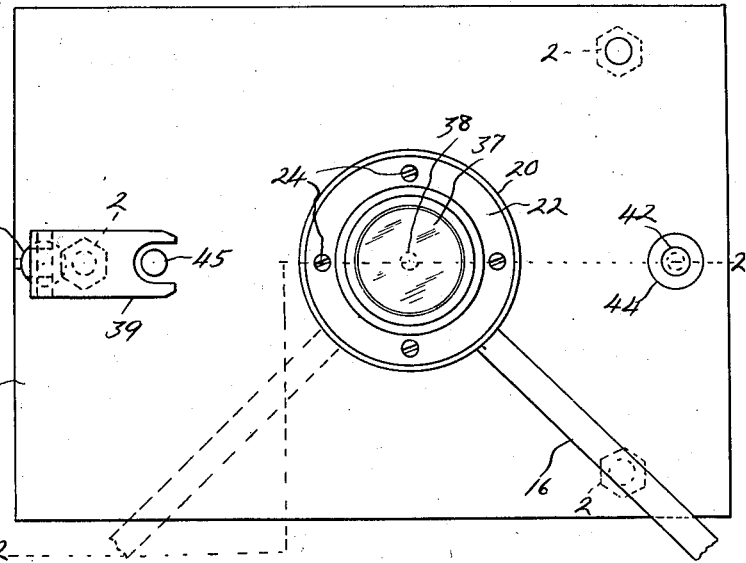
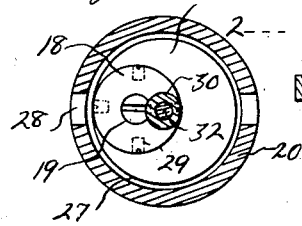
Inventor
Joseph P. Lannen
By J. D. Murray
Attorney Patented Oct. 1, 1929

1,729,947

UNITED STATES PATENT OFFICE

JOSEPH P. LANNEN, OF DETROIT, MICHIGAN

WHEEL-BALANCING APPARATUS

Application filed April 1, 1926. Serial No. 99,116.

This invention relates to constructions for detecting a lack of balance in wheels or the like, and for locating the axis of maximum unbalance, and for determining the amount of material to be removed (or added) to establish a correct balance. The invention further relates to methods for correcting such lack of balance.

One object of the invention is to provide an apparatus for accurately locating the axis of maximum unbalance in a wheel (or the like) which apparatus is considerably less expensive and more simple than machines now available for that purpose.

Another object is to provide for the balancing of a wheel or the like upon a fulcrum member centrally engaging said wheel, and to provide for lifting said wheel clear of said fulcrum member when it is desired to adjust the wheel rotatively.

Still another object is to provide means in association with a wheel balancing device for accurately positioning weights upon the rim of a wheel in said device so as to locate said weights with respect to a wheel marking device positioned for engagement with an opposite portion of said wheel.

A further object is to equip a wheel balancing device with a level such as will indicate a lack of balance along any diametrical axis of the wheel.

A still further object is to determine a lack of balance in a wheel by the use of a set of differential weights respectively equal in value to the weights of material that would be removed from the wheel by a set of drills definitely varying in size, and to compensate for a lack of balance ascertained by one (or more) of said weights by removing material from the wheel at its heavy side by a drill corresponding to said weight.

These and various other objects the invention attains by the construction hereinafter described and illustrated in the accompanying drawing, wherein:

Figure 1 is a plan view of the wheel balancing apparatus.

Figure 2 is a vertical sectional view (drawn to a somewhat larger scale) taken on the line 2—2 of Figure 1, and showing a wheel positioned for testing by the apparatus.

Figure 3 is a horizontal sectional view taken on line 3—3 of Figure 2, disclosing a provision within the chambered lower portion of the work carrier of an adjustable bearing plate upon which the carrier is fulcrumed.

Figure 4 is a cross-section disclosing the cross-sectional form of a glass disc employed in the level.

In these views the reference character 1 designates a base plate, formed preferably of rather heavy metal, such as to give stability. Said plate is equipped with supporting feet preferably establishing a three-point support, and preferably said feet are adjustable with respect to said plate for the purpose of leveling the apparatus. Thus said feet may have the nature of inverted stud bolts 2, the shanks of which are threaded into the base and fixed in selective adjustment relative to the base by locknuts 3.

Mounted upon said base, preferably in a central relation thereto, is a post 4, formed preferably of heavy bar metal, having its lower end portion 5 reduced in diameter to fit a suitable bore in the base, the annular shoulder 6 formed by such reduction seating the post on said plate. The lower end of the portion 5 projects below the plate 1 and is threaded for engagement by a nut 7 clamping the post rigidly to the plate.

Upon said post, a sleeve 8 is mounted for a limited vertical sliding travel, as for example by forming said sleeve with a keyway 9 and engaging in said key-way a Woodruff key 10 set into the post. While vertical actuation of the sleeve 8 may be accomplished in numerous ways, the disclosed embodiment of the invention provides for that purpose a collar 11 embracing the post 4 below said sleeve, said collar being formed at diametrically opposite points with similar vertical sockets 12, receiving pins 13 headed above said collar as indicated at 14, the top faces of the heads being preferably convex. The bottom face of the sleeve 8 rests upon the heads 14, and is machined to form two semi-circular spiral cam faces, having a very slight inclination, and having diametrical shoulders 15 at their intersections. For rotating said collar to raise or lower the sleeve 8 by circumferentially shifting the points of engagement of the heads 14 with the cam faces 15, an elongated handle 16 is attached to the collar 11.

At its upper end, the post 4 is enlarged to form a head 17, upon which a circular bearing plate 18 is pivoted eccentrically to said head by a cap screw 19.

20 is a cylindrical carrier for the wheel 21 undergoing test, said carrier being proportioned to fit within a central opening of said wheel, and being formed with an annular flange 22 at its lower end, forming a seat for said wheel. 23 designates a ring surrounding the post 4 and engaging beneath the head 17, said ring being secured by cap-screws 24 to the flange 22 therebeneath, and having an externally beveled marginal face 24$^a$ co-acting. as will hereinafter be explained, with the internally beveled face 25$^a$ of a ring 25, secured by cap-screws 26 upon the enlarged upper end of the sleeve 8.

The lower portion of the carrier 20 is chambered, as indicated at 27, to freely receive the head 17 of the post 4, and the wall of said chamber is formed with one or more openings 28 through which a tool (not shown) may be passed for selectively engaging peripheral openings 29 in the bearing plate 18, to rotatively shift said plate.

Above said chamber the carrier 20 axially carries a pin 30, having in its lower end a central pocket 31, into which a ball 32 is pressed and projects sufficiently to bear upon the plate 18, and thus centrally support the carrier 20 and the wheel 21. The pin 30 projects at its upper end into a central opening in the top face of the carrier, which opening is threaded to receive a disc 35, forming an abutment for the upper end of said pin. By adjustment of said disc vertically in said opening, the pin 30 may be vertically adjusted with respect to the carrier 20 for the purpose of shifting the ball 32 to or from the horizontal plane determined by the center of gravity of the wheel 21. Since the ball 32 establishes a central universal fulcrum point for the wheel, it is evident that by increasing the distance of said point above the center of gravity of the wheel, the apparatus will become less sensitive, while a decrease in the distance of said point from the center of gravity will increase the sensitivity. Upon the carrier 20 is superposed a level which comprises a shallow vessel 36, receiving a volatile liquid such as alcohol. Said vessel is covered by a glass disc 37 having a concave lower face of large radius (see Figure 4) and as is customary in spirit levels, an air bubble 38, is present in the vessel 36 below the disc 37, said bubble tending to assume a position below the center of said disc when the carrier 20 and the wheel 21 are level. Any travel of said bubble toward the periphery of the vessel 36 indicates the axis of unbalance of the wheel undergoing test. A sleeve 37$^a$ embracing the upper end of the carrier holds the level in place.

39 designates a forked weight positioner which is pivoted as indicated at 40 upon the upper end of a rod 41 rising from the plate 1, said positioner being pivotally adjustable from its position of use shown in full lines in Figure 2 to its inactive position indicated in dash lines in said figure.

At a point diametrically opposite to said weight positioner a center punch is mounted upon the plate 1, said punch comprising a conical head 42 surmounting a stem 43 sliding in a bearing sleeve 44, fixed at its lower end in the plate 1. Normally the head 42 seats upon the upper end of the bearing 44 so as to occupy a spaced relation to the wheel 21. Beneath the plate 1 a spherical handle 45 is attached to the rod 43 for actuating the punch.

In the use of the described apparatus, the wheel 21 to be tested is first set in position upon the carrier 20, preferably while the sleeve 8 is upwardly adjusted such an adjustment relieves the ball 32 of the weight of the carrier and wheel and also clamps the carrier to the post 4 by clamping the ring 23 between the head of said post and the ring 25. This prevents a sudden application of the load of the wheel to said ball, and possible resultant damage to the face of the ball or bearing plate. After positioning the wheel on the carrier, the sleeve 8 is lowered to place the weight of the carrier and wheel upon the ball and if the wheel is lacking in perfect balance (as is almost always the case) there occurs a slight tilting of the wheel and carrier along the axis of unbalance, such tilting being indicated by a travel of the bubble 38 toward the periphery of the level. The operator now marks or otherwise indicates that portion of the rim away from which the bubble has traveled, and then again raises the sleeve 8, relieving the ball 32 of the weight of the wheel and carrier. The wheel is now turned so as to locate its marked point above the center punch, the sleeve 8 is again lowered, and differential weights are successively set upon the rim of the wheel adjacent to the positioning means 39 until there is found such a weight as will return the bubble to a substantially central position in the level. The positioning means insures that the weight thus applied will be located at the same distance from the center of the wheel as is the center punch, for reasons that will presently appear. The proper weight 45 having been selected, the sleeve 8 is again raised sufficiently not only to relieve the ball 32 of the wheel weight but to also clamp the ring 23 against the head 17 so as to hold the carrier rigid. The center punch is now actuated to mark the wheel, and the latter is then removed from the apparatus and is drilled at its marked point to remove an amount of material equal to that of the weight which balanced the wheel. If preferred, the drilling operation may take place while the wheel is still carried by the testing apparatus.

It is a novel feature of the disclosed method of compensating for lack of balance in a wheel that the set of weights used in testing the wheel are of values predetermined to equal the weights of material which would be removed from the rim of the wheel by a selected series of drills. Thus when a certain one of said weights is found to establish the proper balance it is necessary only to use the drill corresponding to said weight to insure definite accuracy in removing the desired amount of material from the heavy side of the wheel.

The opposed beveled faces 24ª and 25ª prevent any appreciable lateral shifting of the carrier and wheel with respect to the post. In the event that any slight shifting does occur while the sleeve 8 is lowered, the engagement of said faces will again center the carrier upon the next upward actuation of said sleeve.

The described apparatus is considerably less expensive and more simple both in construction and operation than such devices as are at present available for a like purpose, and is capable of a higher degree of accuracy than far more expensive machines now in common use. The particular wheel illustrated in the drawing is the fly wheel of an internal combustion engine, but it is, of course, to be understood that the apparatus is applicable for use in testing discs or rings of any kind to detect a lack of balance.

It is necessary for securing accurate results that the bearing surface engaged by the ball 32 be perfectly flat and smooth. The plate 18 on which the ball seats is made pivotally adjustable so that, if the seating surface of said plate becomes unduly worn at its point of engagement by the ball, a different portion of said surface may be brought beneath the ball by adjusting said plate.

In employing the described apparatus for testing pieces of work not substantially the same, different carriers may be used, each suited for work of one kind. If the difference between two pieces merely involves a small difference in the distance of the center of gravity from the surface which seats upon the carrier, as for example when two wheels differ somewhat in thickness, one such carrier as is disclosed by this application can be suited to both pieces by an adjustment of the pin 30 to establish the correct distance of the ball 32 above the center of gravity and by using a plate 18 of correspondingly changed thickness.

What I claim is:

1. A balancing apparatus comprising a support, a work carrier universally pivoted upon said support, and means vertically adjustable upon said support for lifting said carrier and relieving the load on the universal pivot.

2. A balancing apparatus comprising a support, a work carrier, means universally pivoting said carrier upon said support, and means vertically slidable upon said support engageable with said carrier to relieve said pivot means of the weight of the carrier and work.

3. A balancing apparatus comprising a support, an adjustable seat-forming member surmounting said support, a work carrier, a fulcrum member mounted substantially centrally upon said carrier, and normally engaging said seat-forming member, and an element vertically slidable upon said fulcrum support engageable in a raised position with said carrier to lift said carrier and fulcrum member clear of said seating member.

4. A balancing apparatus comprising a support, a work carrier, a fulcrum member arranged to universally mount said carrier upon said support, means vertically adjustable upon said support for lifting the carrier to relieve said fulcrum member of the weight of the work, and a universal level mounted upon the work carrier.

5. A balancing apparatus comprising a support, a work carrier, a fulcrum member adapted to universally mount said carrier upon said support, means for definitely positioning a weight upon the peripheral portion of the work, and means diametrically opposed to said positioning means for marking the work.

6. A balancing apparatus, as defined in claim 5, said weight positioning member being movable to and from a position above the work.

7. A balancing apparatus, as set forth in claim 5, said weight positioning member normally projecting above a peripheral portion of the work and being pivoted for movement to a stored position at one side of the work.

8. A balancing apparatus comprising a post, a work carrier, a fulcrum member adapted to universally mount said work carrier upon said post, and a member slidable upon said post, and engageable with said work support to transfer the load of the work from said fulcrum member.

9. A balancing apparatus comprising a support, a work carrier, means for universally pivoting said carrier upon said support, and a vertically adjustable member engaging and lifting said carrier, through a predetermined travel, to relieve said pivot means of the weight of the carrier and work, and adapted by a further actuation to clamp said carrier upon said support.

10. A balancing apparatus comprising a post having a shoulder adjacent its upper end, a work carrier, means for universally pivoting said carrier upon the upper end of said post, said carrier having a portion extending beneath said shoulder, and a sleeve vertically actuable upon the post and engageable with said carrier to first lift the carrier sufficiently to relieve said pivot means of load, and to subsequently clamp the carrier against said shoulder of the post.

11. A balancing apparatus, comprising a support, a seat forming member pivotally adjustable on said support, a work carrier, a universal fulcrum member carried by said carrier and engageable with said seat forming member, a member carried by said support vertically actuable to lift said carrier and fulcrum member to relieve the latter of load, and means for adjusting said member vertically and for supporting it in a selective position of adjustment.

12. A balancing apparatus comprising a post, a work carrier having its lower portion enclosing the upper end of said post, means for universally pivoting said carrier upon the upper end of said post, a sleeve vertically slidable upon said post and engageable with said carrier to lift the same and relieve said pivot means of load, a collar rotative upon the post below said sleeve, said collar and sleeve having opposed faces one of which is gradually inclined to exercise a cam function, and a member projecting from the other of said surfaces engageable by said cam face to effect a raising and lowering of the sleeve through rotation of said collar.

13. A balancing apparatus comprising a work carrier, a universal fulcrum member centrally carried by said carrier and projecting from the carrier to engage a bearing surface, and a universal level mounted upon said carrier.

14. A balancing apparatus comprising a work carrier having a work supporting projection upon its lower end and having a downwardly opening chamber in its lower portion, a support for said carrier having an enlarged upper end portion projecting into said chamber, means universally pivoting the carrier upon said support within said chamber, and a ring secured to said work supporting projection engaging beneath said enlarged end portion of the support.

15. A balancing apparatus comprising a work carrier, a universal fulcrum member carried by the carrier, a support beneath the carrier, means universally pivoting the carrier on said support, a member mounted upon said support vertically adjustable into and out of supporting engagement with the carrier, said adjustable member co-acting with the carrier to limit lateral shifting of the carrier with respect to said support.

16. A balancing apparatus comprising a work carrier having a downwardly opening chamber in its lower portion, a support for the carrier headed within said chamber, means within said chamber universally pivoting the carrier on said support, means vertically slidable on said support to lift the carrier to thereby relieve said pivot means of load, and a ring secured to the lower end of the carrier co-acting with the last named means to limit lateral shifting of the carrier with respect to said support, and adapted to be clamped by said last named means against said head in a raised position of the carrier.

17. A balancing apparatus, comprising a work carrier having a chambered lower portion, a support for said carrier projecting into said chambered portion of the carrier, means within the chamber of the carrier for universally fulcruming the carrier upon said support, and a universal level surmounting the carrier.

18. A balancing apparatus, comprising a support, a work carrier, means for fulcruming said work carrier upon said support, means for relatively shifting said support and work carrier to relieve the fulcrum means of the weight of said carrier, and a level mounted upon said carrier.

19. A balancing apparatus, comprising a support, a work carrier, means for fulcruming said work carrier upon said support, a level upon said work carrier, and means for raising and lowering said work carrier to disengage said fulcrum means from or engage said means with said support.

20. A balancing apparatus comprising a support, a work carrier, means for pivoting said carrier upon said support, and means for raising said carrier to relieve said pivot means of the weight of said carrier and its load, and for clamping the raised carrier to said support.

21. A balancing apparatus comprising a support, a work carrier, means for pivoting said carrier upon said support, means for relatively adjusting said carrier and support to relieve said pivot means of the weight of said carrier and its load, and means effective upon said carrier in its load-relieving position to clamp said carrier to said support.

22. A balancing apparatus comprising a support, a work carrier, means for pivoting said carrier on said support, and an element adjustable upon said support to raise said work carrier and relieve said pivot means of the weight of said carrier and its load, said carrier having a portion engageable in its raised position between said element and said support to hold the carrier substantially stationary in such position.

23. A balancing apparatus comprising a supporting post having a head upon its upper end, a work carrier, means for pivoting said carrier upon said post, said carrier having a portion extending beneath said head, and a member slidable upon said post for raising said carrier to relieve the pivot means of the weight of the carrier and its load, and for clamping against said head the underlying portion of said carrier.

24. A balancing apparatus comprising a support, a work carrier, means for pivoting said carrier upon said support, a stop upon said support limiting upward adjustment of the carrier, and means adjustable upon said support to raise said carrier into clamping engagement with said stop, whereby said pivot means is relieved of the weight of said carrier and its load.

In testimony whereof I sign this specification.

JOSEPH P. LANNEN.